United States Patent [19]

Lundberg

[11] Patent Number: 4,870,843
[45] Date of Patent: Oct. 3, 1989

[54] SECURITY SYSTEM FOR CYCLES AND THE LIKE

[76] Inventor: Herbert J. Lundberg, Conklin Trailer Park, #19, West Belmar, N.J. 07719

[21] Appl. No.: 267,495
[22] Filed: Nov. 4, 1988
[51] Int. Cl.⁴ .......................................... E05B 71/00
[52] U.S. Cl. ........................................ 70/233; 70/18
[58] Field of Search ................... 70/233, 18, 30, 49, 70/57–58, 226–227, 233–234

[56] References Cited

U.S. PATENT DOCUMENTS 3,800,575  4/1974  Perret ................................... 70/233
4,064,714  12/1977  Treslo .................................... 70/18

FOREIGN PATENT DOCUMENTS 3046810  7/1982  Fed. Rep. of Germany ........ 70/233
2276210  1/1976  France ................................... 70/233
602687  6/1948  United Kingdom .................... 70/18

Primary Examiner—Robert L. Wolfe
Attorney, Agent, or Firm—J. G. Murray

[57] ABSTRACT

A self-retracting and self-retaining combined tether/lock security system for cycles and the like that employs the hollow of the cycle handlebar for storage.

10 Claims, 1 Drawing Sheet

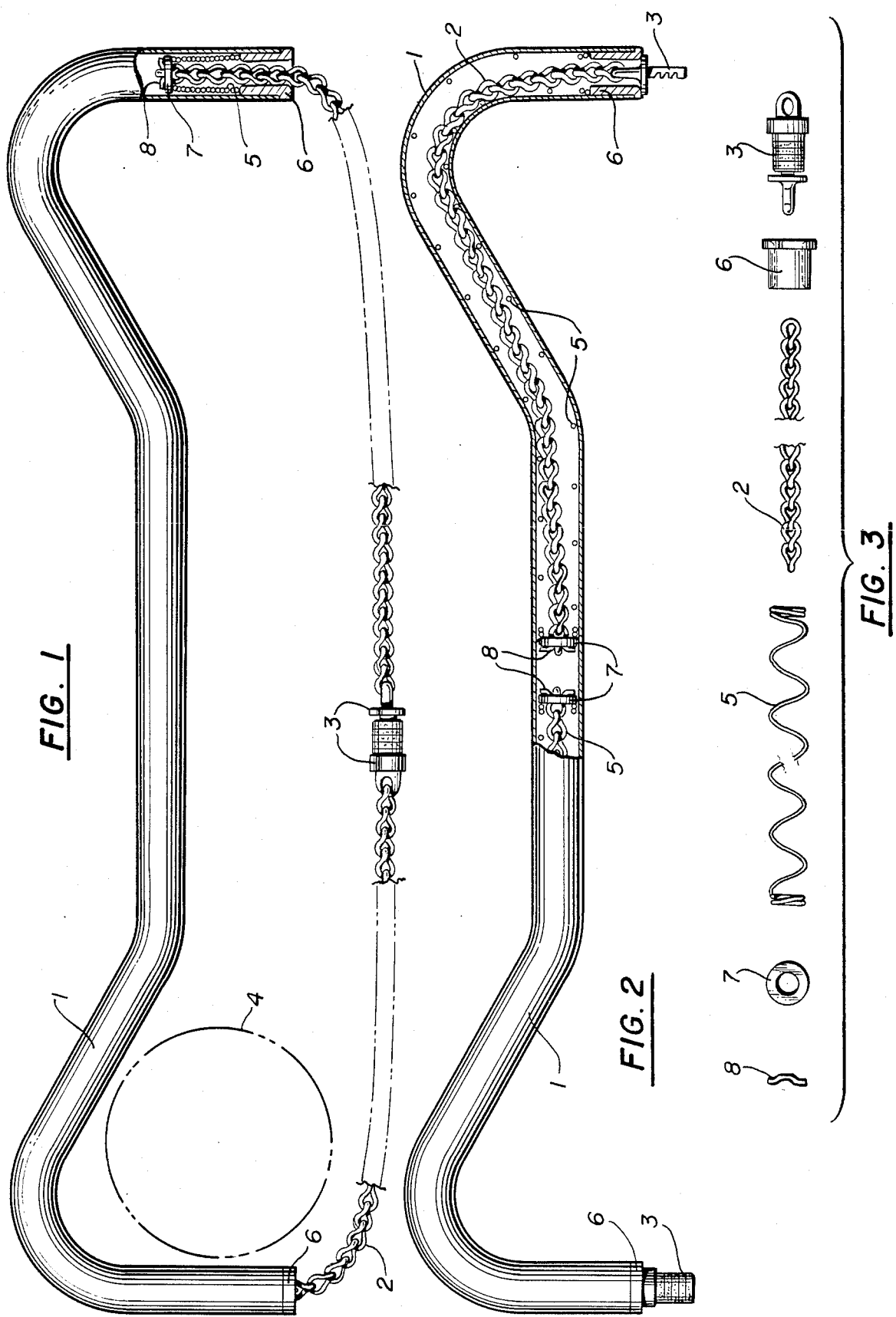

SECURITY SYSTEM FOR CYCLES AND THE LIKE

It is the overall object of this invention to provide today's cyclist a cycle security system having maximum convenience, workability, and safety, for both OEM installation and do-it-yourself installation in cycle handlebars already in use today, at very little cost. All former attempts at practical use or commercial maturity of similar security systems failed because they lacked one or more of the herein described features of this invention.

A primary object of this invention is maximum convenience for the cyclist. For, with the lock fixtures of this invention at rest at their respective opposite end of the handlebar, they are literally at the cyclist's fingertips at all times. This, as opposed to Perret's pad lock 28, a separated unit which has to be cared for itself when not in use, which usually means attaching it somewhere on the cycle frame and locking it there, which then necessitates unlocking and removable therefrom for each then reattachment to it's security tether for re-use in securing the cycle. And, if independent chains or cables are to be compared here, the extra work involved is even greater, for these tethers have to be wrapped around the cycle frame, locked, and unlocked and unwrapped with each use.

A further object of this invention is to provide complete workability and compatability with all curved handlebar designs in use today. For not only does this invention provide a handlebar stored security system for employment in new cycles with perhaps specially constructed handlebars therefore, but also such a security system that will be compatable for installation in the many cycles already in use. This is accomplished in this invention by employing a two part tether system wherein each tether section enters the handlebar from each opposite end and functions internally independently of each other, thus avoiding entirely the internal support center collar found in many already in use handlebars today, as well as being compatable for use by the manufacturers or users of such handlebars in their new OEM handlebar and/or cycle product line. Perret (US3800575) makes no allowance for this internal support collar, which at one end has an ID of 7/16 of an inch, making it doubtful that his expanded stop (26) could fit through this small opening. As well, all important expandable ring lock (24) of Perret leaves something to be desired. It obviously relies on mere friction between it and the handlebar internal wall for retention when, in fact, it would appear the simple act of aerosol spraying a penetrating oil or such into the handlebar would negate the whole system: friction gone, the entire system would pull out. Conversely, this invention teaches use of a special steel handlebar end plug which is cemented in for a tamper-proof, perminently sealed system. It might also be noted of Perret's illustration that the cable shown is substantially longer than the handlebar it is supposed to find storage in.

A further object of this invention is to provide maximum safety in a handlebar-stored tether security system. Perret completely overlooks the fact that his unrestrained handlebar-stored tether could be quite conceivably jossled out of the handlebar when the cycle is in motion. And if this happens and the tether becomes entwined in the spokes of the front wheel we are talking about some broken spokes at slow speeds, but if this happens while the cyclist is moving at a fast speed we are talking about the possibility of the cycle flipping over, throwing the cyclist to the ground. Worst yet, if the cyclist were distracted by, or even paniced by, this happening while in traffic and/or traveling at high speed he or she might crash into something or be crashed into, resulting in grave harm or even death. Clearly, an unrestrained handlebar tether system is dangerous and should be improved upon. And the present invention achieves this in two ways. First, utilizing a two section tether, neither is of sufficient length to offer much hope of becoming entangled in the cycle front wheel, even if unrestrained. Secondly, and most important, strong compression springs restrain both section of tether from ever falling out of the handlebar—this is the major benefit of this invention, which puts safety first.

As well, my present invention teaches a completed-circle, through the handlebar security system which, in being adaptable to all curved designs and styles, when utilized in the most popular racer or ramshorn type, because of it's low position on the cycle, permits also encirclement of the cycle frame when anchoring to an object (tree, pole, or such), provides such total security that even if one were to concieve of removal of the handlebar itself from the cycle, the tether would still anchor the cycle frame to the anchoring object and the cycle could not be removed.

As for Hodgson (US 4064715), this most complex and thus costly supposed solution to the problem is neither feasible or even desirable as a serious deterrent to bicycle theft, given the extremely small diameter of the cable (15) employed here, necessitated by the small size of the housing (10) it is to be stored in. Even that illustrated is larger than actual size if, as Hodgson advises, housing (10) is to fit inside a bicycle handlebar, which typically has an ID of ¾ of an inch. This is further evidenced by the small size of the winding spool (17) which entire cable here is to find storage on. Such a "cable", approximately 1/50 of an inch, could be cut with the smallest of wire cutters, prunning shears, large scissors, knife, etc., and if anything would only provide the cyclist with a false sense of security.

As for Hayessen (Germany 876220), here I question even basic feasability as a true anti-theft device. It appears that the locking mechanism pictured in bicycle frame orifice (5) is of such a simple design as to permit anyone to just pull male fixture (4) straight out of this frame orifice. And if this is so, how can this be considered a patentable anti-theft device, if it can not perform this function.

FIG. 1 represents an exposed top view of one type of handlebar 1 with resident security tether 2 and perminently affixed thereto combination lock 3 extended and in use, encompassing such as a pole 4 as anchoring means, with compression springs 5 usably compressed: These combination locks 3 can be the same kind presently found in commerce and used with present independent cycle tether systems.

FIG. 2 represents an exposed top view of similar handlebar 1 with resident security tether 2 and perminently affixed thereto combination lock 3 separated and not in use, with resident compression springs 5 extended and restraining lock fixtures 3 against handlebar end plugs 6. Presently handlebar end plug 6 is a collection of common steel washers, having the correct dimensions, cemented together: a larger washer having the same OD as the handlebar typically; 3 or more smaller washers of a size to allow typically 1/16th of an inch between them and handlebar inner surface, which the epoxy cement or such will fill for a strong and lasting bond. The effected handlebar inner surface is sanded with sandpaper to ready it for the cement.

FIG. 3 attempts to show all parts necessary a typical assembly here.

Assembly comprises drawing security tether 2 through, first, the handlebar end plug 6, then through compression spring 5, then through retaining washer 7, whereas then retaining cross pin 8 is placed through typically the first link of security tether. A similar procedure is performed with opposite tether, and then both now fully assembled units are simply slid into their respective handlebar openings, with handlebar end plugs 6 then being cemented in place at handlebar opening, to then cure in situ.

While a preferred embodiment of the invention has been shown and described herein, it is obvious that numerous omissions, changes and additions may be made in such embodiment without departing from the spirit and scope of the invention.

What I claim is:

1. A self-retracting security tether assembly for cycles and the like comprising:
   a rigid, hollow tube having first and second open ends;
   first and second tether sections mounted in the tube, each section including a flexible chain or cable having a washer fixed at one end and a locking means fixed at the other end for locking engagement with each other;
   first and second plugs each slideably mounted on one of the chains or cable and each being fixed to said tube at a different one of said open ends with said locking means extending therefrom; and
   first and second helical coil springs, each mounted about one of said chains or cable and extending between said corresponding washer and plug so that said springs, when in an expanded state, forces said chains into said tube and are compressed between the plug and washer when said chains or cable are pulled from said tube through said plugs.

2. The assembly of claim 1 wherein said tube has a length greater than the combined lengths of said first and second tether sections.

3. The assembly of claim 2 wherein said tube constitutes the handlebars of a cycle.

4. The assembly of claim 1 wherein the self-retracting tether is a cable.

5. The self-retracting security tether of claim 1 wherein the tether is of one single length or section, exiting and entering through one tube opening only.

6. The self-retracting security tether of claim 1 wherein extension coil springs are employed for retraction.

7. The self-retracting security tether of claim 1 wherein a length of meterial having rubber-like properties is employed as the means of retraction.

8. A self-retracting security tether assembly for cycles and the like comprising:
   a rigid hollow tube having first and second open ends;
   a single tether mounted in the tube, comprising a flexible chain having a washer fixed at one end and a locking means fixed at the other end for locking engagement with opposite mateable locking means perminently affixed to other opening in said tube;
   a plug slideably mounted on said flexible chain and fixed to one of said openings in said tube, with said locking means extending therefrom; and
   a helical coil spring mounted about said flexible chain and extending between said corresponding washer and plug so that said springs, when in an expanded state, forces said chain into said tube.

9. The self-retracting security tether of claim 8 wherein extension coil springs are employed for retraction.

10. The self-retracting security tether of claim 8 wherein a length of material having rubber-like properties is employed as the means of retraction.

* * * * *